May 10, 1927.  1,628,443

A. D. THOMAS

MECHANISM FOR OPENING AND CLOSING GATES, DOORS, AND THE LIKE

Filed April 3, 1924  3 Sheets-Sheet 1

Inventor:
Arthur D. Thomas
By Kent W. Wonnell Atty.

May 10, 1927.

A. D. THOMAS 1,628,443

MECHANISM FOR OPENING AND CLOSING GATES, DOORS, AND THE LIKE

Filed April 3, 1924    3 Sheets-Sheet 2

Inventor:
Arthur D. Thomas
By Kent W. Worrell Atty.

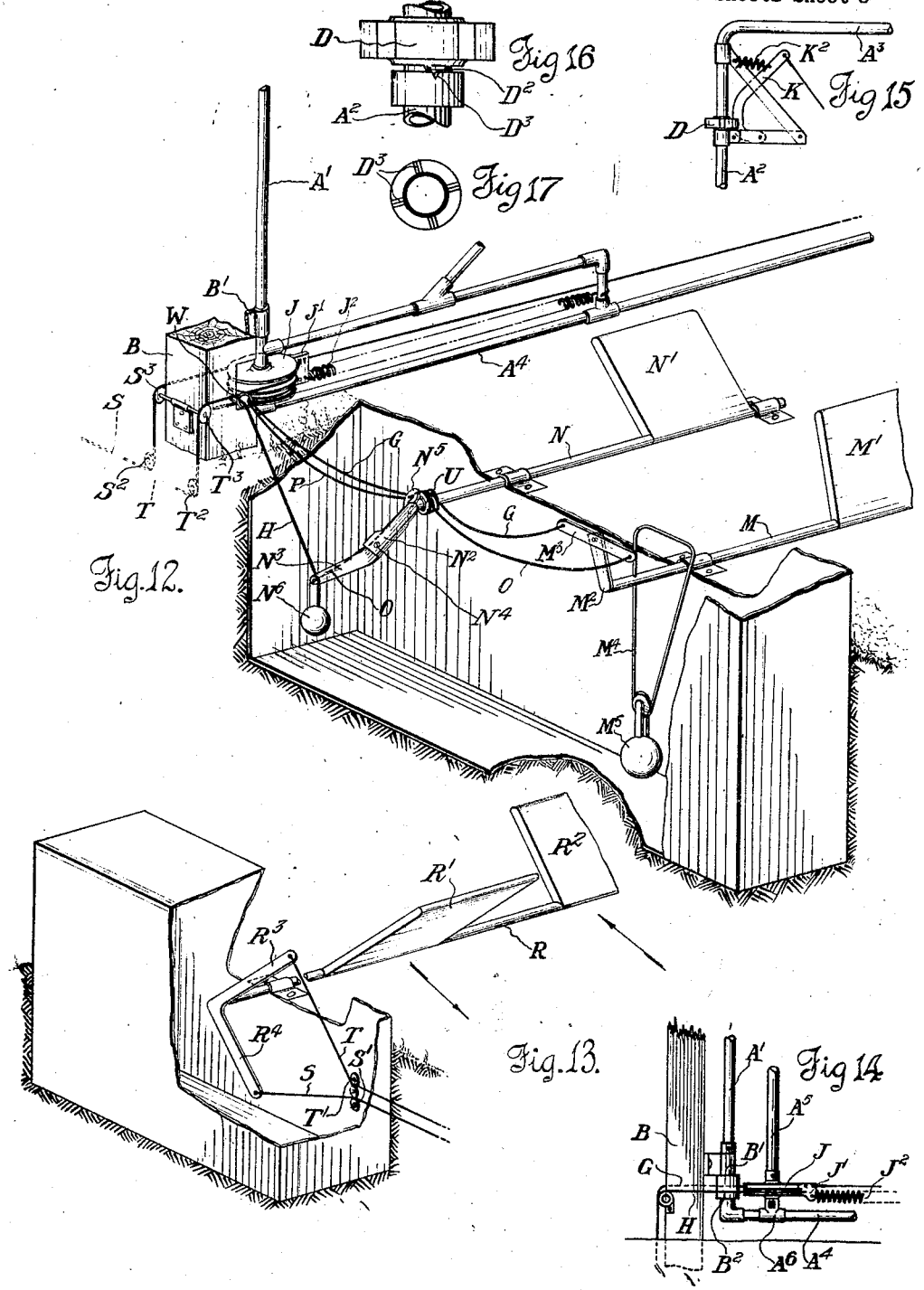

Patented May 10, 1927.

1,628,443

UNITED STATES PATENT OFFICE.

ARTHUR DOUGLAS THOMAS, OF BLACK ROCK, VICTORIA, AUSTRALIA.

MECHANISM FOR OPENING AND CLOSING GATES, DOORS, AND THE LIKE.

Application filed April 3, 1924, Serial No. 703,849, and in Australia April 19, 1923.

This invention relates to improvements in mechanism for opening and closing gates and doors and the like and refers especially to mechanism applicable to field and other gates and doors of garages or other buildings whereby the same may be opened and closed by the passage of a vehicle to and from the same. The invention is also applicable to the operation of semaphore signals and the like.

The object of the present invention is to provide simple and efficient mechanism for attachment to a gate or door which is adapted to be actuated automatically to open and close the said gate or door by the movement of two or more hinged levers which are preferably operated by the engagement of the said levers with the wheels of a vehicle passing thereover.

I accomplish the above mentioned object by providing on one or both sides of the gate an apparatus which consists of hinged levers (such as depressible ground levers) having cranked arms or extensions to which flexible connections are attached leading around or to a radial member (such as a drum or grooved wheel) revolvably mounted on the hinging stile of the gate (or vertical member adjacent thereto) and then to a spring controlled latch whereby the operation of one ground lever (such as by the weight of a vehicle passing thereover) will cause the latching lever or bolt to be unfastened and the gate to be swung open and the operation of the other ground lever will cause the said gate to be closed and fastened after the vehicle has passed through the opening. The flexible connections can be passed around the said radial member on the hinging stile of the gate and then through a locating member (such as a staple) to the latch or fastening, or alternatively the said flexible connections can be attached to the said radial member after passing around the same for a half turn or more and a separate connection provided between the said radial member and the latch or fastening for operating the same. These operating levers may be arranged upon opposite sides of the gate or door or both upon one side thereof.

The initial movement of the operating levers, flexible connections and radial member first actuates the latching lever or bolt in opposition to the action of a spring and secondly in opposition to the compression or tension of a second spring to facilitate the opening and closing action of the gate.

The device will operate to cause the gate to open and positively close and lock the same irrespective of the direction in which the vehicle is approaching or moving away from the same while at the same time the gate is capable of being operated by hand independently of the said mechanism.

For convenience of description in this specification certain terms and expressions are employed, but it is to be understood that they are not to be interpreted in a limiting sense, for example, the term "gate" will include doors, semaphores and any other hinged, pivoted or swinging member capable of being manipulated by flexible connections by the application of the invention, and the term "ground lever" will include any other hinged levers capable of operating the flexible connections for the purpose of the invention, and the term "radial member" or "drum" or "grooved pulley" will include a segment, bracket, hinged radial arms, hinged or pivoted to the hinging stile of the gate (or on a vertical member adjacent thereto) arranged in such manner that the flexible connections are enabled to perform their requisite functions for the purposes of the invention.

Referring now to the accompanying sheets of drawings:—

Figures 12 and 13 are perspective views of two ground levers working in conjunction and their connections to the gate, one of the said levers being operative with a vehicle passing in one direction, and the other ground lever operative with a vehicle passing in the opposite direction as shown by the arrows.

Figure 14 is a view showing the application of the invention to existing gates.

Figure 15 is a view showing another design of latch.

Figures 16 and 17 are views showing a special application of the latch illustrated in Figure 4, and in Figure 15.

Throughout this specification and the various figures of the drawings the same reference letters indicate corresponding parts.

A is a gate which is of any known construction having vertical and horizontal members in the usual manner; the vertical member A′ comprising the hinge member and the vertical member A² being the latch member connected together by a top horizontal member A³ and a bottom horizontal member A⁴. This gate A is mounted upon a hinge post B and supported in suitable hinges B′ on the hinge stile A′ which may be pivoted in the usual known manner. The latch stile A² engages a latch post C with a suitable latch D which may be of ordinary construction capable of being released by longitudinal tension against a spring. A special construction of latch is hereinafter described but it will be understood that the operation of the main part of the invention is not dependent thereon nor confined thereto.

Figure 1:
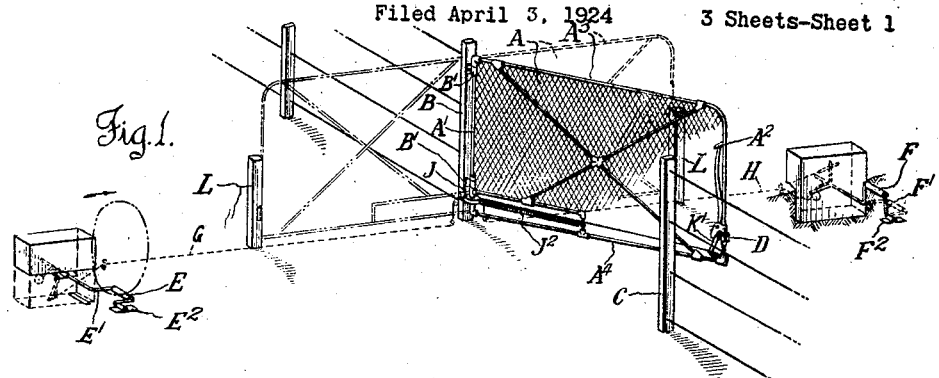
Figure 1 illustrates the application of this invention to an ordinary field gate which is shown as opening when the left hand ground lever is depressed by the wheel of a vehicle passing thereover.

For the purpose of actuating the gate A to both open and close by the operation of suitable ground levers, such as by the passage of the wheel of a vehicle thereover, I provide as shown in Figure 1 a pair of ground levers E and F mounted in convenient positions, one upon either side of the gate A for the passage of the vehicle. The construction of these ground levers E and F is shown more particularly in Figure 5 and the operation of these levers E and F correspond in detail. The levers E and F are each formed as an upwardly projecting crank or loop upon spindles or shafts E′ and F′ mounted in suitable bearings E² and F². Upon the other ends of the spindles or shafts E′ and F′ are provided a pair of cranks E³, E⁴ and F³, F⁴ respectively, at an angle to each other, the cranks E³ and F³ being suitably weighted while the other cranks E⁴ and F⁴ have a knuckle joint formed by links E⁵ and F⁵ being pivoted on the ends thereof with a turned end which engages the body of the said cranks E⁴, F⁴ and acts as a stop therefor.

In the drawings illustrating this modification of the invention, I have shown two cranks E³, E⁴ and F³, F⁴, on the spindles or shafts E and F respectively, the cranks E³ and F³ being only for the purpose of providing counter-weights adapted to bring the ground levers E′ and F′ back into operative positions after the vehicle has passed thereover. However, it will be clear that the cranks E⁴ and F⁴ with their attached links E⁵ and F⁵ may perform their function of returning the levers E′ and F′ to their normal operative position in which case the weighted cranks E³ and F³ may be dispensed with.

A flexible connection G (such as a wire, chain, or cord) is attached to the link E⁵ of the ground lever E and a similar flexible connection H is attached to the link F⁵ of the ground lever F. These flexible connections G and H pass over suitable guide pulleys G′ and H′ respectively, and then around opposite sides of a grooved roller or drum J which is loosely mounted on the hinging stile A′ of the gate A or upon a separate vertical member A⁵ (Figure 14). These flexible connections G and H may be attached to the drum or roller J or an extension thereon upon the opposite side to the hinge post B or to a looped member or staple J′ or the said flexible connections G and H may pass freely through the said loop or staple J′.

A coiled spring J² is provided connecting the drum or roller J (or the aforesaid extension thereon) with the framework of the gate, the tension serving to keep the staple J′ (or the point of connection of the flexible members G and H to the said drum or roller J) in alignment with the gate. When the said spring J² is connected to an extension on the drum or roller J, an increased leverage on the spring will be imparted when pulled by the flexible connections G and H to swing the gate with greater force.

The flexible connections G and H after passing through the loop or staple J′ on the roller or drum J are connected direct to the latch lever of the gate or a separate connection may be made from the said drum or roller J to the latch lever where the terminals of the flexible connections G and H are attached to the drum or roller J, or to an extension thereon.

It will be obvious that the function of the drum or roller J is to act as a guide for the flexible connections G and H and to permit of the tension of the said connections G and H to be imparted to the gate out of longitudinal alignment, consequently a segment or a bracket, or radial arms revolvably mounted or hinged or pivoted on the hinging stile A' would equally answer the purpose.

Figure 2:
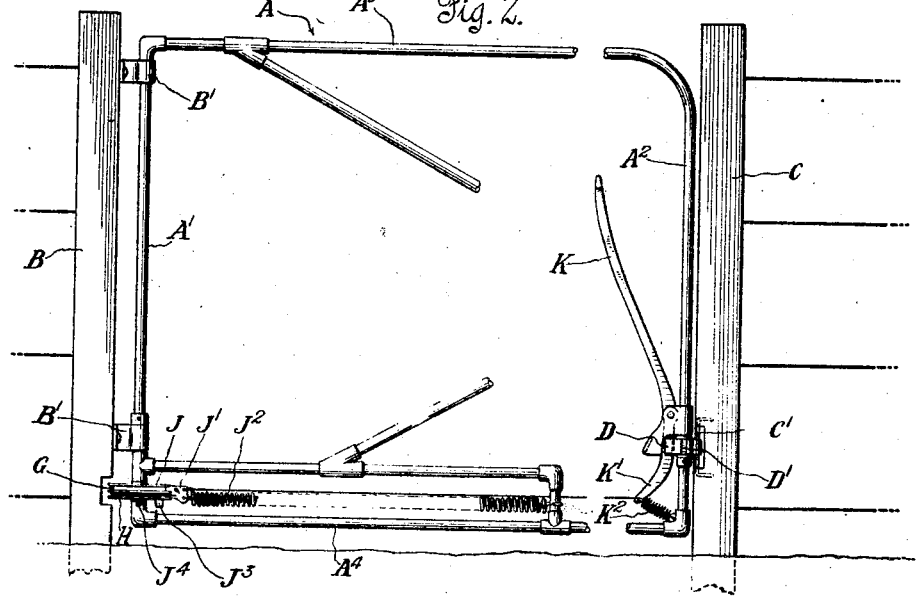
Figures 2 and 3 are detail views showing the construction and operation of the gate illustrated in Figure 1.
Figure 4:
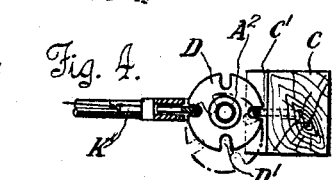
Figure 4 is an enlarged plan view of a latch specially adapted for use with this invention.

As stated, any suitable catch may be used, provided it has a movement longitudinally with the gate and is adapted to be released by being pulled in the direction of the longitudinal axis of the gate. But in Figures 4 and 15, I have shown a latch specially adapted for use with this invention. This latch comprises a notched roller D loosely mounted on the latch member $A^2$ of the gate, the notches D' being adapted to engage simultaneously a stop C' on the post C and a trigger K' attached to a pivoted handle or lever K on the gate A. A spring $K^2$ serves to keep the trigger in engagement with the notch of the roller D and hold the same locked in place. Though this catch D is shown in Figures 1 and 2 mounted at the bottom of the stile $A^2$ it will be obvious that it may be mounted higher up the stile $A^2$ and the connections from the roller J deflected thereto by suitable guide pulleys on the gate A as shown in Figure 15.

The operation of the gate is clearly shown in Figures 1, 2, 3, 4 and 5 of the drawings. In the latter figure the different positions assumed by the ground levers being shown, the full lines representing the normal position, the chain dotted lines the position when the left hand lever is depressed, and the plain dotted lines the closing operation by the depression of the right hand lever after which the levers are returned to normal position by the balance weights on the ends of the cranks $E^3$ and $F^3$.

Figure 3:
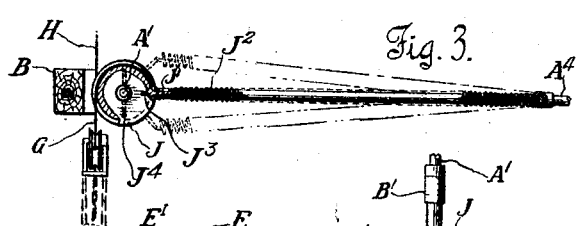
Figure 5:
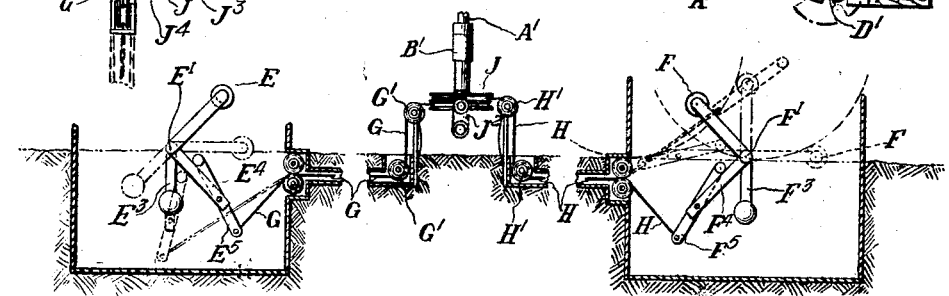
Figure 5 is an enlarged view of the two ground levers and hinging stile shown in corresponding relationship to each other.
Figure 6:
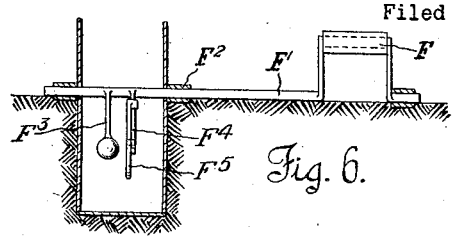
Figure 6 is a section through the box or casing housing, one of the levers showing the same in elevation.
Figure 7:
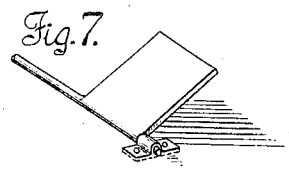
Figure 7 is an alternative construction of ground lever.

When the left hand lever E is depressed by the wheel of a vehicle as shown in Figures 1 and 5, the tension on the flexible connection G partially rotates the drum or roller J which operates to release the catch D by pulling the trigger K' out of engagement with the notch in the roller D against the tension of the spring $K^2$. The tension of the flexible connection G in partially rotating the drum or roller J brings the loop or staple J' out of alignment with the gate (as shown in Figure 3) and thus imparts a swinging movement to the said gate (assisted by the tension of the spring $J^2$) when the latch is completely disengaged (as shown in Figure 1). It will be noticed that, as the roller D is leaving the stop C' on the latch post C it undergoes a partial rotation, thus placing another notch D' in position to engage with the stop on the stop post L.

In order to prevent the roller D from spinning as it leaves a stop, a pair of diametrically opposite webs or fins $D^2$ are formed on the underside of the roller D and the said webs are adapted to engage with corresponding grooves or recesses $D^3$ when the roller D has moved sufficiently far to be disengaged from the stop C' as shown in Figures 16 and 17.

A lug $J^3$ is attached to or is formed on the underside of the drum or roller J and corresponding stops $J^4$ are attached to the hinging stile A' of the gate as shown in Figures 2 and 3 the same being adapted to limit the movement of the said roller.

When the gate is swung to an angle of about 90° a notch in the catch D engages a stop on a stop post L thereby locking it in its open position and permitting the vehicle to pass through. At the same time the rotative movement of the drum or roller J imparts a reverse tension on the flexible connection H connected to the ground lever F on the other side of the gate and this tension brings the said lever F into an approximately upright position (as shown on the right hand in Figure 5) so that it is in an engaging position for the wheel of the vehicle. As the vehicle passes onward, its wheel engages this second ground lever F and depresses the same to the position shown in dotted lines (Figures 5) and the knuckle joint formed by the link $F^5$ assumes the position as shown thus compensating for the greater angular movement of the lever F and the tension on the flexible member H attached thereto partially rotates the drum or roller J in a reverse direction to release the catch D from the stop-post L upon which the spring $J^2$ will swing the gate into its closed position where the catch D engages the stop C' on the latch post C and securely locks it. The counter-weight on the crank $F^3$ then brings the ground lever F back into its normal position to meet an approaching vehicle.

It will be seen that the ground levers E and F automatically set themselves to meet an approaching vehicle in either direction— that is to say, for an approaching vehicle the levers are set as shown in Figure 5 in full black lines while for a leaving vehicle they assume the position shown in chain-dotted lines (Figure 5).

When the invention is applied to a gate or door which opens in one direction only (such as the doors of a garage) both the ground levers E and F may be disposed on the same side of the gate or door, one being in advance of the other. In this case, the ground lever nearest the gate is elevated when the gate is closed, and when the said lever is depressed to open the gate, the second lever is raised and remains in this position until the gate is closed. When the gate or door is opened by hand, the nearest lever is lowered and the other lever is raised so that, when a vehicle moves thereover, after passing through the gate, it will be depressed and cause the said gate to be closed and latched. The lever located nearest the gate is arranged to be depressed toward the said gate and the lever situated farthest from the gate is depressed away from the gate.

Or, alternatively, ground levers as illustrated in Figure 13 may be adapted for operating a gate or door which opens in one direction only. These levers as illustrated in Figure 13 are arranged in pairs $R'$, $R^2$ and for convenience are mounted on the one rock shaft $R$, though it will be obvious that the levers or plates $R'$, $R^2$ may be upon independent shaft. The rock shaft $R$ has two cranks $R^3$, $R^4$, at about right angles to each other. Flexible connections are attached to these cranks $R^3$, $R^4$, and to or around a rotatable radial member (such as a drum or roller) on the hinging stile of the gate or door (or adjacent vertical member) in opposite directions, similar connections to the latch being provided as previously described.

In operation the depression of one plate or lever $R'$ will swing the gate or door in one direction to open the same, elevating the other plate or lever $R^2$ while the depression of the other plate or lever $R^2$ will swing the gate or door in the opposite direction to close the same elevating the first plate or lever $R'$ so that it is in position to operate.

When it is desired to operate a gate or door which swings in one direction only, by levers on both sides of the said gate or door, a pair of levers $R'$, $R^2$ (as shown in Figure 13) are mounted upon each side having cranks $R^3$, $R^4$, to which flexible connections are attached. One of these flexible connections passes around the far side of the drum or roller $J$ on the hinging stile of the gate (or adjacent vertical member) while the other passes through a guide on the hinge post and then around the near side of the said drum or roller $J$. The same arrangement is duplicated with the pair of levers $R'$, $R^2$, on the other side of the gate. Consequently, the depression of a lever $R'$ on one side of the gate through its flexible connection swings the gate open, elevates the other lever $R^2$ and, at the same time, reverses the elevation of the levers $R'$, $R^2$, on the other side of the gate, so that the passing on of the vehicle will depress the lever which operates to close the gate.

In Figures 8, 9, 10, 11, 12 and 13 is shown a modification of this invention which is more especially adapted for use with the gates of residences where the approach from a street or roadway and across a footpath does not permit of the accommodation of the ground levers $E$ and $F$ as illustrated in Figure 1. This construction is adapted for the manipulation of a gate which opens in one direction only and permits of the approaching ground levers being positioned close to the gate, so that the same may be set only a few feet in from the street alignment.

In the modification referred to above, the door or gate which opens and closes in one direction only can be operated from the one side by a pair of depressible levers or plates $R'$ and $R^2$ formed on or fitted to a single rock shaft $R$ having on one end thereof a pair of arms $R^3$ and $R^4$ disposed at right angles, and from the other side it can be operated by a pair of rock shafts $M$ and $N$ mounted parallel to and at a little distance from each other.

The arms on the first mentioned rock shaft $R$ are normally disposed as shown in Figure 13 and from the arm $R^3$ a flexible connection $T$ passes over guide pulleys $T'$, $T^2$ and $T^3$ (Figure 12) around the outer side of the grooved drum $J$ to the staple $J'$ thereon also from the arm $R^4$ a flexible connection $S$ passes over guide pulleys $S'$, $S^2$ and $S^3$ around the inner side of the grooved drum $J$ to the lug $J'$ (Figure 12).

In Figure 12, the gate post $B$ is shown as of about the same cross section as the diameter of the drum or roller $J$ in which case the flexible connections $S$ and $T$ may pass on either side thereof as shown. Where the post $B$ is of greater cross section than the diameter of the drum or roller $J$ the said flexible connections $S$ and $T$ would pass round suitable guide pulleys mounted on the inside of the said post $B$ adjacent to the hinging stile $A'$.

The said pair of rock shafts $M$ and $N$ are provided with depressible levers or plates $M'$ and $N'$ or roller cranks which are adapted to lie in the path of a vehicle passing through the gate from the street.

One end of the rock shaft $M$ nearest the street is provided with a crank arm $M^2$ arranged in the same plane as that in which the depressible lever or plate $M'$ thereon is situated. This arm $M^2$ supports a centrally pivoted lever $M^3$ to the inner end of which is attached a flexible member $G$ which passes over an idle pulley $U$ through a guide $W$ attached to the post $B$ and around the outer side of the drum $J$ on the gate $A$ and is secured to the lug $J'$.

The opposite end of the centrally pivoted lever $M^3$ is provided with a flexible connection $O$ which passes over the idle pulley $U$ on the rock shaft $N$ to the lower end of a lever $N^3$ (as shown in dotted lines) pivoted to an arm $N^2$ on the second rock shaft $N$ located nearer the gate.

The lower end of the pivoted lever $N^3$ on the second rock shaft $N$ is also fitted with another flexible connection $H$ which passes through the guide W and around the inner side of the drum J on the gate A to the lug J'.

The lever N³ on the arm of the second rock shaft has a knuckle jointed connection N⁴ with the said arm and is provided with an upward extension N⁵ which is connected by a flexible member P which passes through the fixed guide W and is secured to the lug J' after passing around the outer side of the drum J on the gate A.

The lower end of the pivoted lever N³ on the second rock shaft N is provided with a counter weight N⁶ which normally retains the said lever in an inoperative position.

The arm N² on the second rock shaft N is disposed at right angles or approximately at right angles to the depressible lever, plate or roller crank N' thereon.

The outer end of the first mentioned rock shaft M is fitted with a looped member M⁴ having a travelling counter weight M⁵ supported thereon and adapted to retain the same in operative and in inoperative positions.

When the gate is closed the depressible levers, plates or cranks M' and N' on the rock shafts M and N on the outside of the gate are in the position shown in Figure 12 while the depressible levers R' and R² on the inside of the gate are in the positions shown in Figure 13.

Figure 8:
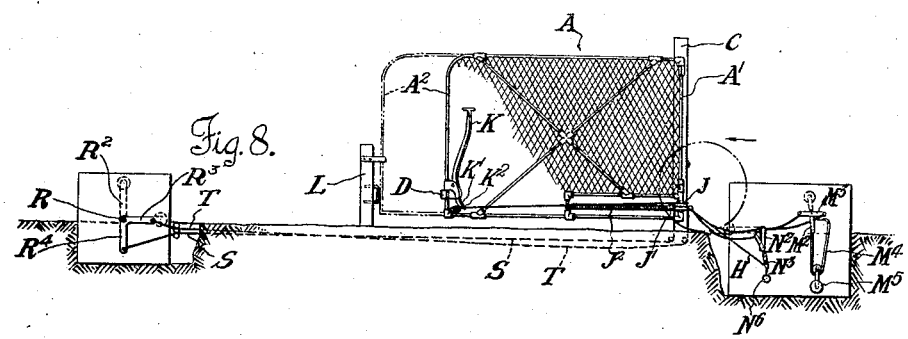
Figures 8 and 9 illustrate a modified form of this invention showing a gate just opening upon the depression of a ground lever by a wheel of a vehicle passing thereover.
Figure 9:
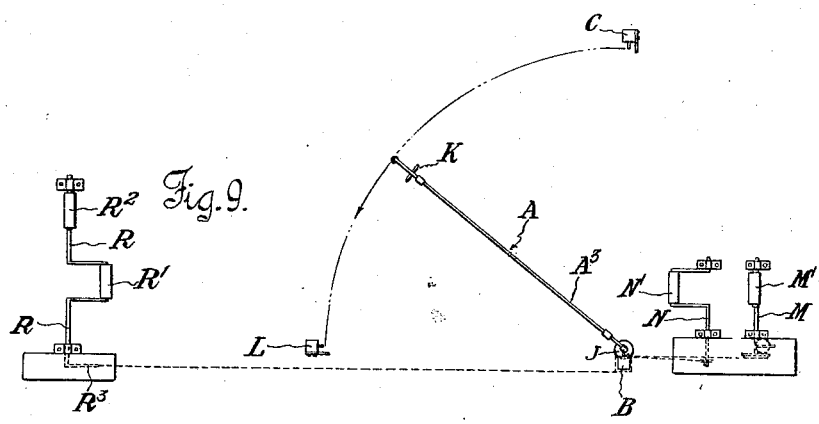
Figure 10:
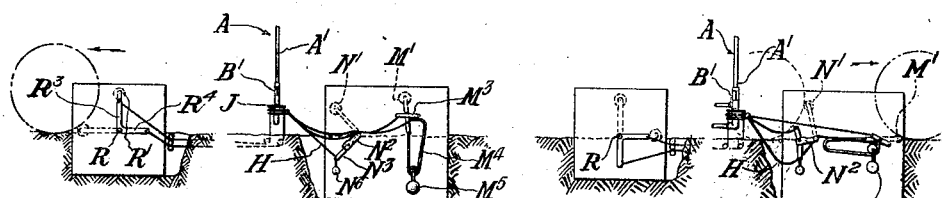
Figure 10 is a detail view of the ground levers showing the closing operation of the gate illustrated in Figure 8, due to the wheel of the vehicle depressing a further ground lever.

Upon a vehicle approaching the gate or door from the outside the lever M will be depressed but as the flexible connections G and O slack the gate will not be operated and the lever M' will be restored to its original position by the weight M⁵ after the wheel has passed thereover. When the wheel engages with and depresses the lever N' a tension is imparted to the flexible connection H which rotates the drum J which in turn releases the catch and opens the gate as hereinbefore described, and as shown in Figures 8 and 9. Should the lever M' be depressed by the last vehicle moving outward, the next rotation of the drum J exerts tension on the flexible connection G causing the said lever M' to re-assume a vertical engaging position. The opening of the gate also exerts a tension on the flexible connection T which lowers the lever R' and raises the lever R² (as shown in Figure 8) which is depressed upon the wheel passing thereover, the tension of the flexible connection T then closing the gate, thus restoring the levers to normal position.

Figure 11:
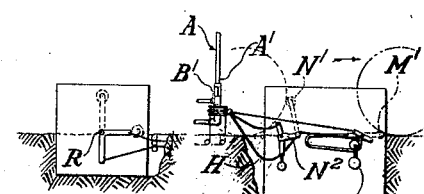
Figure 11 is a detail view showing the closing operation of the gate when the vehicle is moving from the left.

As a vehicle approaches the gate or door from the inside the lever R' is depressed to exert a tension on the flexible connection S which partially rotates the drum J and opens the gate. The opening of the gate A releases the connection H thus allowing the weight N⁶ to depress lever N' so that the front wheel of the vehicle after moving through the gate passes over N' and engages M' which in being depressed exerts a tension on the flexible connection O which raises N' to engage the rear wheel of the vehicle as shown in Figure 11. The lever M' when depressed by the front wheel is retained in position by the weight M⁵ sliding to the other end of the looped member M⁴. The lever N' upon being depressed by the rear wheel of the vehicle closes and latches the gate by means of the flexible connection P passing around the near side of the radial member J, thus restoring the apparatus to its normal position.

In a case where two vehicles following in an outward direction without an intervening vehicle passing in an inward direction the depression of the lever R' on opening the gate A will exert tension on the flexible connection G, which will cause the travelling counter-weight M⁵ to move to the opposite end of the loop M⁴ and thus bring the lever M' into an approximately vertical position, so permitting the lever N' to be depressed by the counterweight N⁶.

When this invention is applied to an existing gate, an auxiliary member A⁵ is utilized to carry the drum or roller J, the said member A⁵ being clamped to the gate A by means of split connections A⁶ as shown in Figure 14. Using this construction, a roller B² may be provided on the hinging stile A' as a guide for the flexible connections.

The flexible members connecting the operating levers to the drum are provided with turn buckles or other approved length adjusting devices and adjustably mounted pulleys can be provided to govern the direction of the pull on the said flexible members.

Though the invention is herein described as being actuated by ground levers operated by the wheels of a passing vehicle, it will be understood that the same mechanical arrangement may be adopted to use with hinged levers operated by hand.

I claim:—

1. In mechanism for opening and closing hinged gates, a drum revolvably mounted on the lower part of the hinging stile of the gate, a staple on the side of the drum remote from the hinging post, a tension spring having one end connected to the staple and the opposite end to the gate at a distance from the hinging stile, a latch on the latching stile of the gate, a connection between the latching stile and the staple, a pair of rock shafts supporting depressible ground levers and arranged one on either side of the gate in an engageable position for the wheels of a vehicle, cranks on the rock shafts, links pivoted to the cranks and having stops on one of their ends adapted to engage the bodies of the cranks, flexible connecting members passing from the links and around the rotatable drum in opposite directions and secured to the staple, so constructed and arranged that when the ground levers are depressed the drum will be oscillated to impart an increased tension to the spring firstly to release the latch and then to swing the gate into an open or closed position.

2. Mechanism for opening and closing gates, having rock shafts with depressible levers thereon, cranks on the said rock shafts, arms pivoted to said cranks and having a knuckle joint connection therewith, a hinging stile on the gate, a radial member on said hinging stile, a flexible connection attached to one end of each of the pivoted arms and leading to the radial member, and stops on the other ends of the pivoted arms adapted to engage the bodies of the cranks.

3. In mechanism for opening and closing gates, pivoted ground levers positioned adjacent the gate and in the path of the wheels of vehicles approaching and passing through the same, a radial member supported rotatively upon the hinging stile of the gate, a spring connection between the radial member and the gate frame, flexible members connecting the ground levers to the radial member, a stop on the radial member and stops on the gate for limiting the movement of the said radial member, and a balance weight attached to each rock shaft and adapted to restore the said ground levers to normal position after the operation thereof.

4. Mechanism for opening and closing gates and the like, comprising a pair of rock shafts supporting depressible ground levers and arranged one upon either side of the gate in an engageable position for the wheels of a vehicle passing to and through the gate, cranks on the rock shafts, links pivoted to the cranks and having stops on one of their ends adapted to engage the bodies of the cranks, a radial member rotatively mounted on the hinging stile of the gate, a staple on the radial member, connecting members passing from the opposite ends of the links to and around the rotatable radial member and through the staple and to the latch of the gate, and a spring connecting the said staple to the said gate, the tension of the said spring serving to maintain the said staple in alignment with the gate.

In testimony whereof I affix my signature.

ARTHUR DOUGLAS THOMAS.